United States Patent
Delaney et al.

(10) Patent No.: US 10,909,472 B2
(45) Date of Patent: Feb. 2, 2021

(54) UTILIZING RADIO SIGNAL EMITTING DEVICES ON FABRIC ITEMS TO CONTROL TEMPERATURE

(71) Applicant: International Business Machines Corporation, Armonk, NY (US)

(72) Inventors: John Delaney, Meath (IE); Sean Fornash, Hudson, NH (US); Anthony Hunt, Hopewell Junction, NY (US); Maeve O'Reilly, Greenane Village (IE); Zheng Xie, Dublin (IE); Clea Zolotow, Key West, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 602 days.

(21) Appl. No.: 15/623,776

(22) Filed: Jun. 15, 2017

(65) Prior Publication Data
US 2018/0363930 A1  Dec. 20, 2018

(51) Int. Cl.
*G06N 20/00* (2019.01)
*H04L 29/08* (2006.01)
(Continued)

(52) U.S. Cl.
CPC ............. *G06N 20/00* (2019.01); *A41D 1/002* (2013.01); *A41D 31/06* (2019.02); *F24F 11/30* (2018.01);
(Continued)

(58) Field of Classification Search
CPC .... G06N 20/00; G05D 23/1917; H04L 67/12; H04L 12/2823; F24F 11/62; F24F 11/63;
(Continued)

(56) References Cited

U.S. PATENT DOCUMENTS 5,973,602 A   10/1999  Cole, III et al.
9,372,123 B2   6/2016  Li et al.
(Continued)

FOREIGN PATENT DOCUMENTS

EP          3045829        7/2016
WO    WO 2016/115230       7/2016

OTHER PUBLICATIONS

Huang, C. et al, "The Potential and Challenges of Inferring Thermal Comfort at Home Using Commodity Sensors," Proceedings of the 2015 ACM International Joint Conference (2015).
(Continued)

*Primary Examiner* — Catherine T. Rastovski
(74) *Attorney, Agent, or Firm* — Scott Dobson, Esq.; George S. Blasiak, Esq.; Heslin Rothenberg Farley & Mesiti P.C.

(57) ABSTRACT

Methods, computer program products, and systems are presented. The method computer program products, and systems can include, for instance: obtaining radio signal encoded data from one or more radio signal emitting device disposed on one or more fabric item used for thermal insulation by a user; performing data processing using an obtained environmental temperature of the user and one or more thermal characteristic, wherein the one or more thermal characteristic is determined using the radio signal encoded data; and providing one or more output based on the data processing.

20 Claims, 10 Drawing Sheets

(51) Int. Cl.
| | |
|---|---|
| *G05B 15/02* | (2006.01) |
| *G05D 23/19* | (2006.01) |
| *A41D 1/00* | (2018.01) |
| *A41D 31/06* | (2019.01) |
| *G06K 19/07* | (2006.01) |
| *H04L 12/28* | (2006.01) |
| *F24F 11/30* | (2018.01) |
| *F24F 11/62* | (2018.01) |
| *F24F 110/12* | (2018.01) |
| *F24F 11/63* | (2018.01) |
| *F24F 120/20* | (2018.01) |
| *F24F 110/10* | (2018.01) |
| *G06F 16/23* | (2019.01) |

(52) U.S. Cl.
CPC .............. *F24F 11/62* (2018.01); *G05B 15/02* (2013.01); *G05D 23/1917* (2013.01); *H04L 12/2823* (2013.01); *H04L 67/12* (2013.01); *F24F 11/63* (2018.01); *F24F 2110/10* (2018.01); *F24F 2110/12* (2018.01); *F24F 2120/20* (2018.01); *G06F 16/235* (2019.01); *G06K 19/0723* (2013.01)

(58) Field of Classification Search
CPC ......... F24F 11/30; G05B 15/02; A41D 1/002; A41D 31/06
See application file for complete search history.

(56) References Cited

U.S. PATENT DOCUMENTS

| | | | |
|---|---|---|---|
| 2012/0072007 A1* | 3/2012 | Rock .................... | G06Q 50/04 700/132 |
| 2014/0039691 A1* | 2/2014 | Gupta ................. | F24F 11/0001 700/278 |
| 2014/0305524 A1 | 10/2014 | Heizer et al. | |
| 2015/0351982 A1* | 12/2015 | Krenik .................. | A61G 7/018 5/616 |
| 2017/0109461 A1* | 4/2017 | Dutt .................... | G01N 21/4738 |
| 2017/0135884 A1* | 5/2017 | Lachenbruch ........ | A61F 7/0053 |
| 2018/0144232 A1* | 5/2018 | DeBates .......... | G06K 19/07749 |
| 2020/0229514 A1* | 7/2020 | Cooper ................. | A41D 1/002 |

OTHER PUBLICATIONS

Kwon, J. & Choi, J., "Clothing Insulation and Temperature, Layer and Mass of Clothing Under Comfortable Environment Conditions," Journal of Physiological Anthropology (2013).

\* cited by examiner

UTILIZING RADIO SIGNAL EMITTING DEVICES ON FABRIC ITEMS TO CONTROL TEMPERATURE

BACKGROUND

The Internet of Things (IoT) has been recognized as the next significant revolution of Internet. The so-called IoT refers to providing various real-world things, such as streets, roads, buildings, water-supplying systems and household appliances with something like sensing devices, connecting them through the Internet and thereby executing specific programs, so as to achieve remote control or direct communication with these real-world things. The IoT has widened the scope of connected objects from electronics to all kinds of real-world things, that is, archiving human-machine communication and interaction, as well as the communication and interaction between objects by means of radio frequency identifications (RFIDs), sensors, binary codes and the like provided for various kinds of things through connecting to wireless networks via interfaces. As a result, many real world things can be monitored and operated through networking and their behaviors can be programmed and analyzed for human convenience.

SUMMARY

Shortcomings of the prior art are overcome, and additional advantages are provided, through the provision, in one aspect, of a method. The method can include, for example: obtaining radio signal encoded data from one or more radio signal emitting device disposed on one or more fabric item used for thermal insulation by a user; performing data processing using an obtained environmental temperature of the user and one or more thermal characteristic, wherein the one or more thermal characteristic is determined using the radio signal encoded data; and providing one or more output based on the data processing.

In another aspect, a computer program product can be provided. The computer program product can include a computer readable storage medium readable by one or more processing unit and storing instructions for execution by one or more processor for performing a method. The method can include, for example: processing system data to establish a relationship graph; determining that a user is encountering cognitive recall obtaining radio signal encoded data from one or more radio signal emitting device disposed on one or more fabric item used for thermal insulation by a user; performing data processing using an obtained environmental temperature of the user and one or more thermal characteristic, wherein the one or more thermal characteristic is determined using the radio signal encoded data; and providing one or more output based on the data processing.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining radio signal encoded data from one or more radio signal emitting device disposed on one or more fabric item used for thermal insulation by a user; performing data processing using an obtained environmental temperature of the user and one or more thermal characteristic, wherein the one or more thermal characteristic is determined using the radio signal encoded data; and providing one or more output based on the data processing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
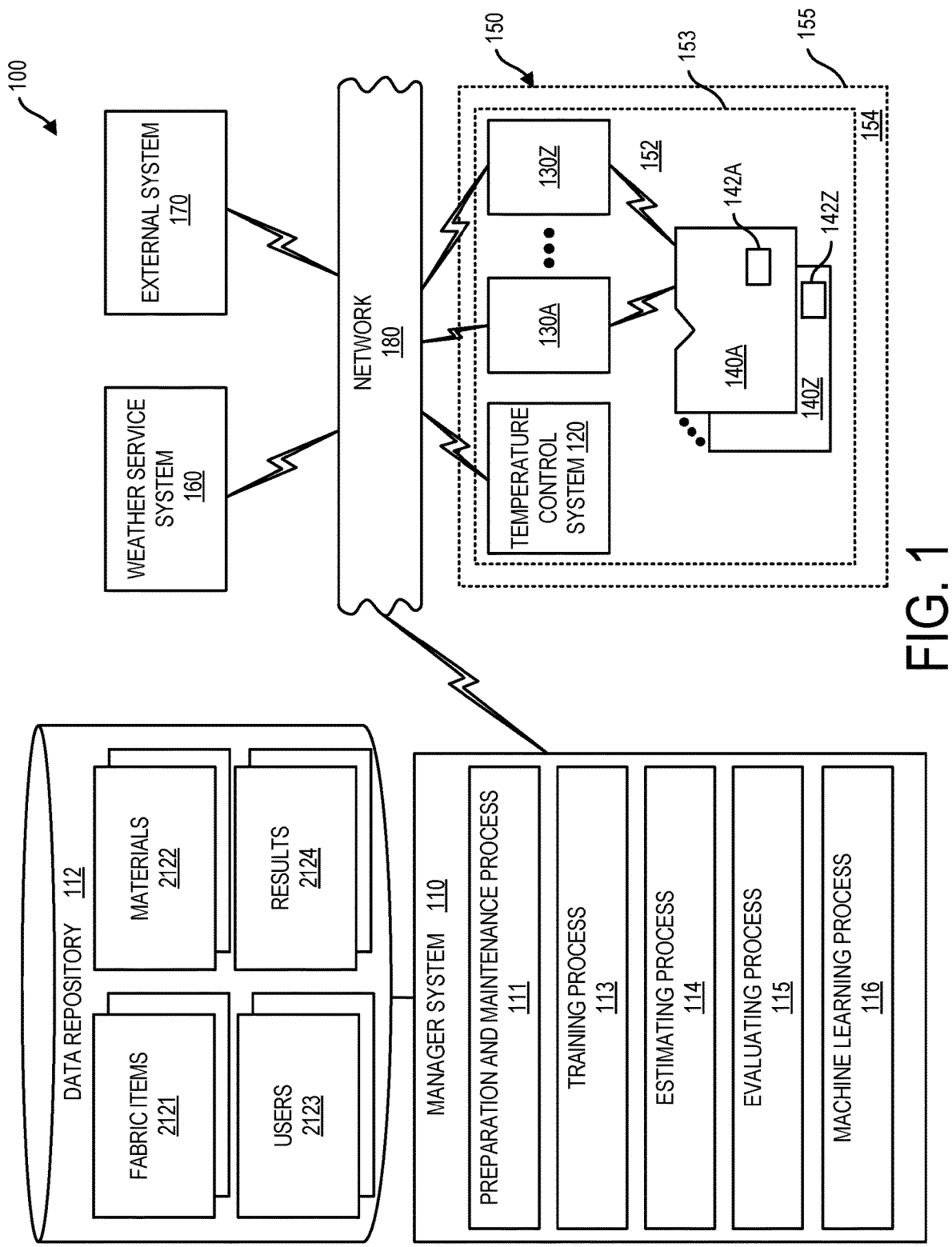
FIG. 1 is a block schematic diagram of a system having a manager system, a plurality of user computer devices, and a weather services system.

FIG. 1 depicts a system for use in monitoring fabric items used by a user for thermal insulation as well as temperature conditions of an environment. System 100 can include a manager system 110 having an associated data repository 112 and one or more computer devices 130A-130Z disposed in an operating environment 150. Operating environment 150 can include an area within dashed border 155 and can include a building indicated by dashed border 153, an interior environment 152 defined internal to dashed border 153, and an outside environment 154 defined externally to dashed border 153. One or more user of one or more computer device 130A-130Z, can be users who transition between inside environment 152 and outside environment 154.

Within operating environment 150 there can be disposed one or more fabric items 140A-140Z. There can be disposed on the respective fabric items one or more radio signal emitting device 142A-142Z. Fabric items can include one or more of at least one apparel item and at least one bedding item. Radio signal emitting devices 142A-142Z, in one embodiment can be provided by RFID tags. An RFID tag as set forth herein can be provided e.g. by a passive RFID tag or an active RFID tag. A radio signal emitting device as set forth herein can alternatively be provided e.g. by a processor based computing node having radio signal transmit and receive capability. The one or more fabric items 140A-140Z where provided by apparel items can be worn by a user.

In one embodiment operating environment 150 can include, a single user e.g. a single user that wears one or more fabric item 140A-140Z provided by an apparel item and who uses one or more computer device e.g. computer devices 130A-130Z. In one embodiment, operating environment 150 can include a plurality of users. For example, operating environment 150 can include a patient user who wears one or more fabric item provided by an apparel item and who can use one or more computer device of one or more computer devices 130A-130Z. An operating environment 150 in one embodiment can include a caregiver user who uses one or more computer device of one or more computer devices 130A-130Z.

Referring to additional components of system 100, system 100 can include a weather service system 160 and an external system 170. Manager system 110, user computer devices 130A-130Z, weather services system 160, and external system 170 can be in communication via network 180. Network 180 can include, e.g. a physical telecommunications network and/or a virtual network. In one embodiment, manager system 110 can be external to each of one or more computer devices 130A-130Z, weather service system 160, and external system 170. In one embodiment, manager system 110 can be co-located with one or more computer devices 130A-130Z, weather service system 160, or external system 170.

Manager system 110 can run various processes, including preparation and maintenance process 111, training process 113, estimating process 114, evaluating process 115, and machine learning process 116.

Manager system 110 can run preparation and maintenance process 111 to prepare and maintain data within data repository 112 for use in other processes, such as training process 113, estimating process 114, evaluating process 115, and machine learning process 116. Manager system 110 can run training process 113 to train manager system 110 so that manager system 110 is able to provide one or more thermal insulation characteristic. For example, running training process 113 a user interface can be exposed that allows a user to register new items of apparel into data repository 112 so that manager system 110 has an ability to provide an estimate of thermal insulation level provided by the new apparel items.

Running estimating process 114, manager system 110 can provide an estimate of thermal insulation level provided by one or more fabric item of one or more fabric items 140A-140Z e.g. one or more apparel item for wearing by a user to provide thermal insulation and/or one or more bedding item for use by a user to provide thermal insulation. For example, running estimating process 114, manager system 110 can look up and use various data stored in data repository 112 during performance of training process 113.

Running evaluating process 115, manager system 110 can evaluate adequacy of thermal insulation level provided by current apparel worn by a user relative to a temperature of an environment of the user. The environment of the user can include the current environment of the user and/or an expected environment of the user e.g. an inside environment and/or an outside environment. Manager system 110 running machine learning process 116 can store results data e.g. positive results data and/or negative results data and can use such results data for improved performance of manager system 110 over time.

Data repository 112, associated with manager system 110 can store various data. Fabric item data e.g. apparel item data and/or bedding item data can be stored in fabric items area 2121. Fabric item data can include data on apparel items and or bedding items registered into data repository 112 via running of training process 113. Fabric items data can include such information as: serial number, a friendly name for the apparel item, a thermal rating e.g. as provided by a user, a thickness of material, and a porosity.

Materials area 2122 can store data on materials that can be include in apparel items. For example, running preparation and maintenance process 111, manager system 110 can iteratively "crawl the web" for information on common materials that are used in apparel items, and such data can be stored in materials area 2122.

Running estimating process 114 for determining a thermal insulation characteristic of one or more fabric item, manager system 110 can look up material properties information that may have been stored in materials area 2122. In users area 2123, data repository 112 can store data on various users of system 100. Embodiments herein recognize for example that different users may react differently to wearing a commonly configured apparel item having common thermal insulation level or to using commonly configured bedding.

In results area 2124, data repository 112 can store data on results recorded using system 100. From time to time, manager system 110 running machine learning process 116 can record results achieved using system 100, e.g. as can be measured by a body temperature of a user. For example, a user of system 100 and wearer of one or more apparel item can wear a computer device in the form e.g. of a smartwatch, which monitors the users body temperature. Manager system 110 can iteratively read such body temperature data with associated state data such as apparel items currently worn and a temperature of an environment. Configuration setup data resulting in a target body temperature being achieved can be stored in a positive results area and configuration setup data resulting in a target body temperature not being achieved can be stored in a negative results area of results area 2124. Later estimating and/or evaluating performed by the manager system 110 can be biased based on the results data.

Figure 2:
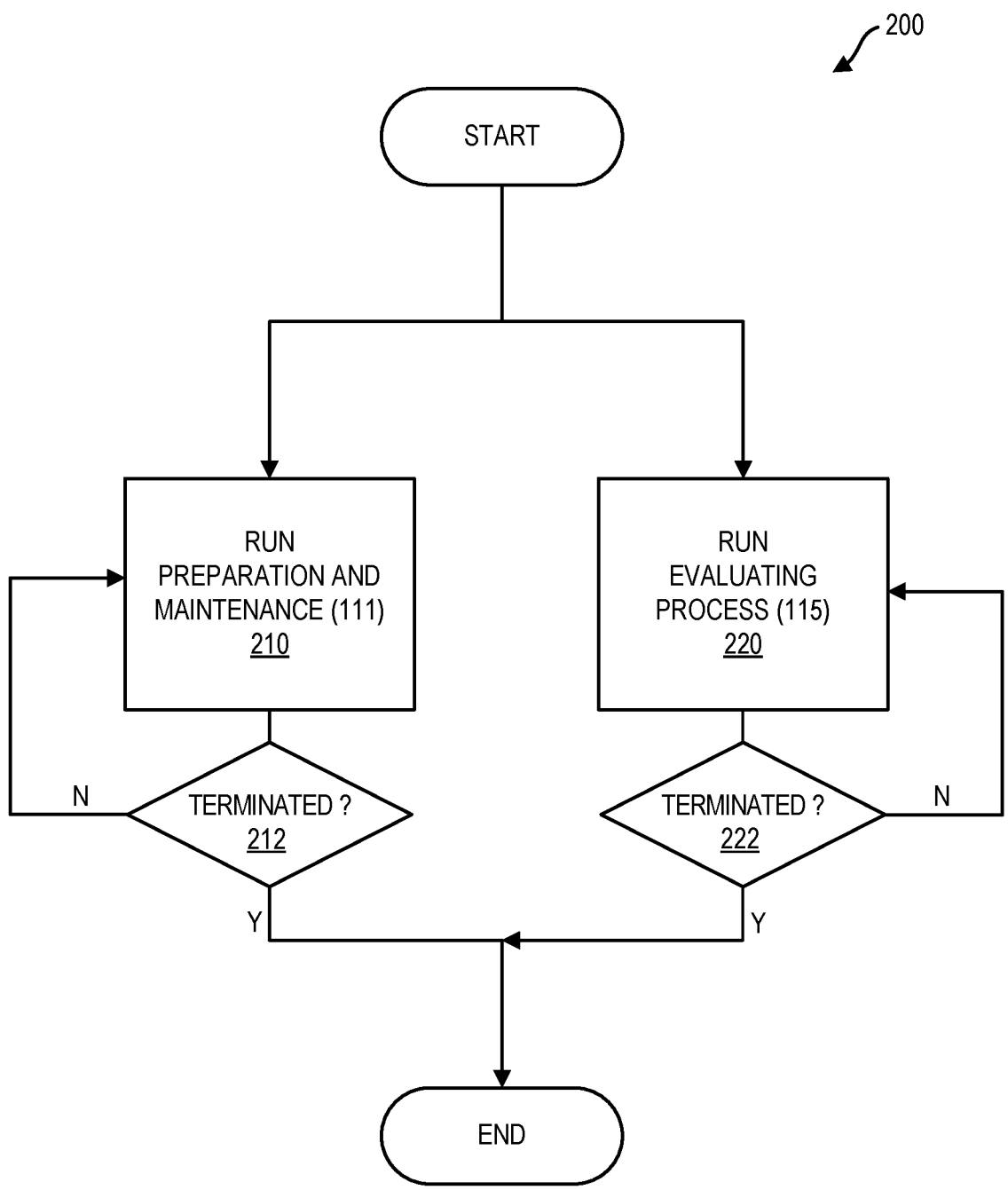
FIG. 2 is a flowchart illustrating a process coordination method for performance by a manager system according to one embodiment.

FIG. 2 is a flowchart illustrating a method 200 that can be performed by manager system 110. At block 210, manager system 110 can run preparation and maintenance process 111 e.g. to populate, prepare, and/or maintain various data of data repository 112 including data of fabric items area 2121, materials area 2122, users area 2123 and results area 2124. Manager system 110 can run preparation and maintenance process 111 until process 111 is terminated at block 212. At block 220, manager system 110 can run evaluation process 115 to evaluate whether a current layer arrangement defined by one or more fabric item used by user is appropriate for a temperature condition. Manager system 110 can run evaluation process 115 until evaluation process 115 is terminated at block 222. For running of evaluating process 115 estimating process 114 can be iteratively run.

For performance of preparation and maintenance process 111, manager system 110 can be configured to automatically receive communication from computer devices 130A-130Z, as well as from weather service system 160 and external system 170. One or more external system 170 can be e.g. a server system of fabric item supplier that stores data on fabric items. One or more external system 170 can be e.g. a server system of materials supplier that stores data on a material determined to be included in a fabric item. Manager system 110 can run Natural Language Processing (NLP) processes for the performing of preparation and maintenance process 111.

Figure 3:
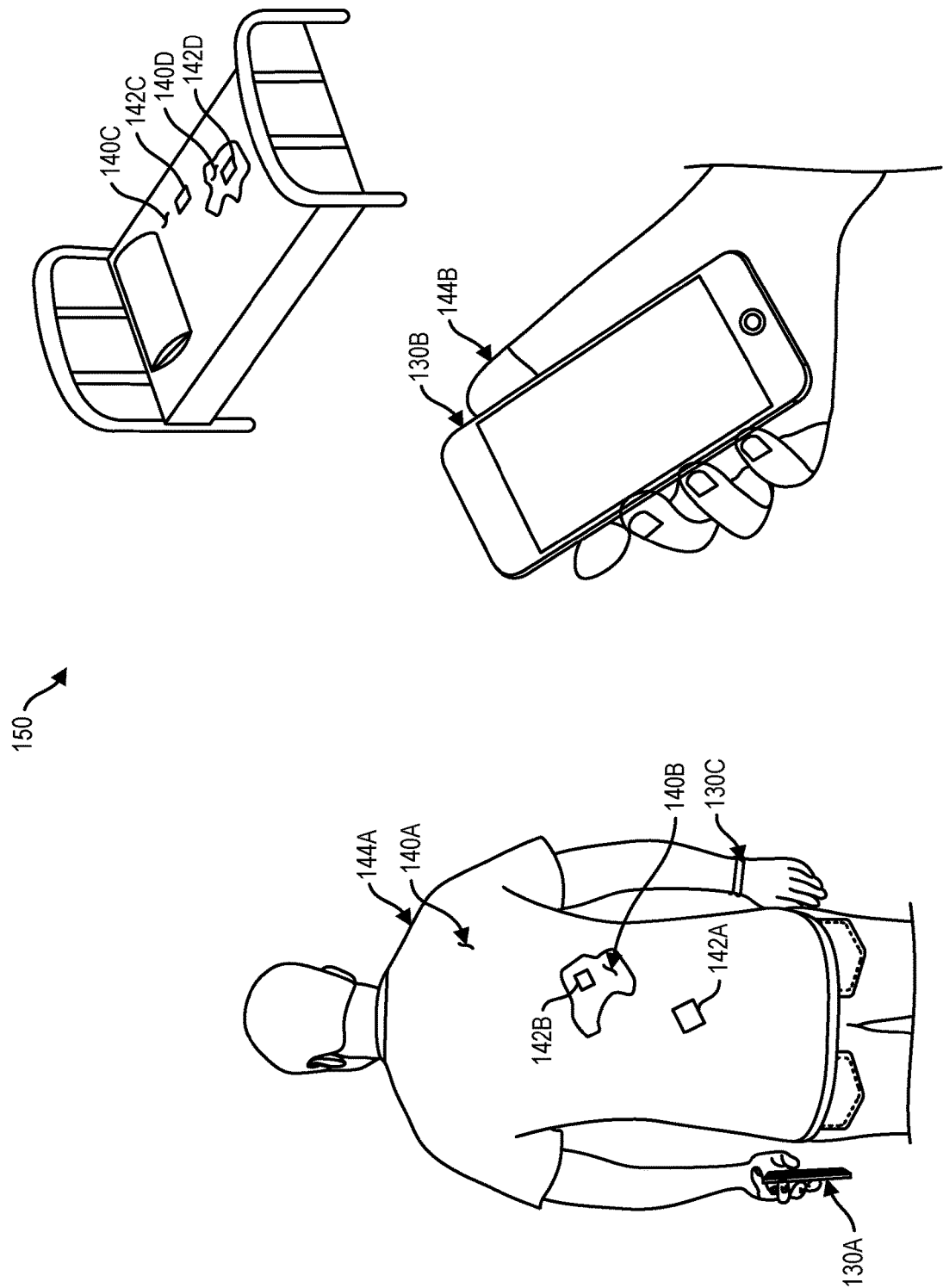
FIG. 3 is a physical view depicting an environment having a patient user, a caregiver user, a plurality of computer devices, and a plurality of radio signal emitting devices disposed on respective apparel items.

Referring to FIG. 3 an exemplary operating environment 150 in one embodiment, is illustrated. In one embodiment, operating environment 150 can include multiple users such as patient user 144A and caregiver user 144B. However, operating environment 150 can include a single user or additional users. Operating environment 150 in the embodiment of FIG. 3 can include a plurality of user computer devices 130A-130Z, including computer device 130A provided in the embodiment shown by a smart phone used by a patient user 144A and computer device 130B, provided by a smart phone used by caregiver user 144B and computer device 130C provided by a smart watch worn and used by a patient user 144A. Operating environment 150, in the embodiment of FIG. 3 can include a plurality of fabric items used for thermal insulation by a user. Fabric items used for thermal insulation by a user in the operative environment 150 as shown in FIG. 3 include fabric item 140A provided by an apparel item worn by patient user 144A, fabric item 140B provided by an apparel item worn by a patient user 144A, fabric item 140C provided by a bedding layer for use by patient user 144A, and fabric item 140D provided by a bedding layer for use by patient user 144A. Radio signal emitting device 142A can be disposed on fabric item 140A, radio signal emitting device 142B can be disposed on fabric item 140B, radio signal emitting device 142C can be disposed on fabric item 140C, and radio signal emitting device 142D can be disposed on fabric item 140D. In general, caregiver user 144B can use computer device 130B to initially register fabric items so that data on fabric items 140A-140D is registered in data repository 112. All of the operations performed with use of computer device 130B can be redundantly performed used computer device 130A and computer device 130C. On registering fabric items 140A-140D in data repository 112, one or more of computer devices 130A-130C can be used to read radio signal encoded data of radio signal emitting devices 142A-142D. Using the read data, manager system 110 can determine a thermal insulation characteristic of one or more fabric item 140A-140D. Manager system 110 can perform data processing using the thermal insulation characteristic and a determined temperature of operating environment 150. Based on the data processing, manager system 110 can provide one or more output.

A method for performance by manager system 110 in one embodiment is illustrated with reference to the flowchart of FIG. 4. At block 410, manager system 110 can perform obtaining radio signal encoded data from one or more radio signal emitting device disposed on one or more fabric item used for thermal insulation by a user obtaining radio signal encoded data from one or more radio signal emitting devices 142A-142Z disposed on one or more fabric item 140A-140Z used for thermal insulation by a user. At block 420, manager system 110 can perform data processing using an obtained environmental temperature of the user and one or more thermal characteristic, wherein the one or more thermal characteristic is determined using the radio signal encoded data. At block 430, manager system 110 can perform providing one or more output based on the data processing. An output can include e.g. an output to control temperature control system 120 and/or a notification output to a computer device e.g. computer device 130A-130Z as shown in FIG. 3 that prompts adjustment of a fabric item provided by an apparel item and/or a bedding item. Data processing at block 420 in one embodiment can include running evaluating process 115 and can include processing to evaluate a thermal comfort of the user.

Figure 4:
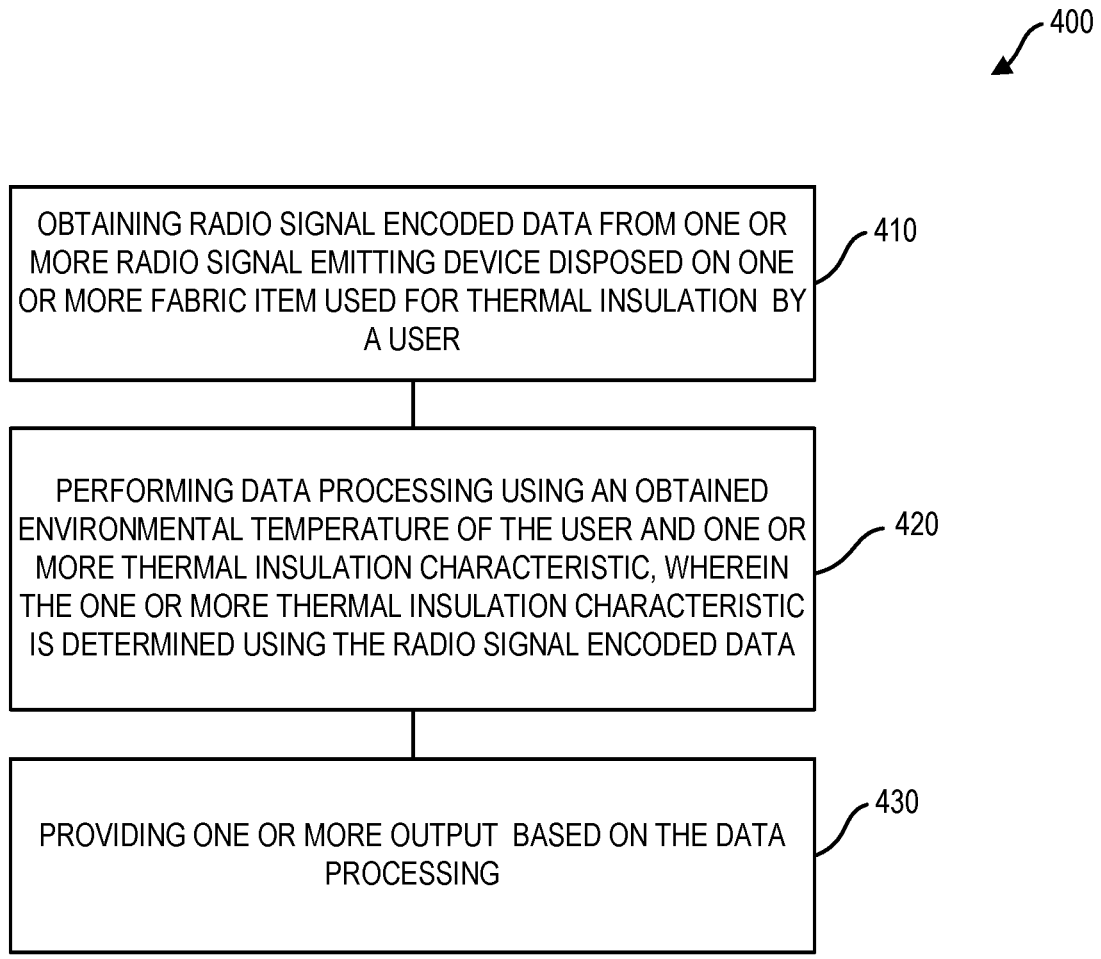
FIG. 4 is a flowchart illustrating a method for performance by a manager system according to one embodiment.
Figure 5:
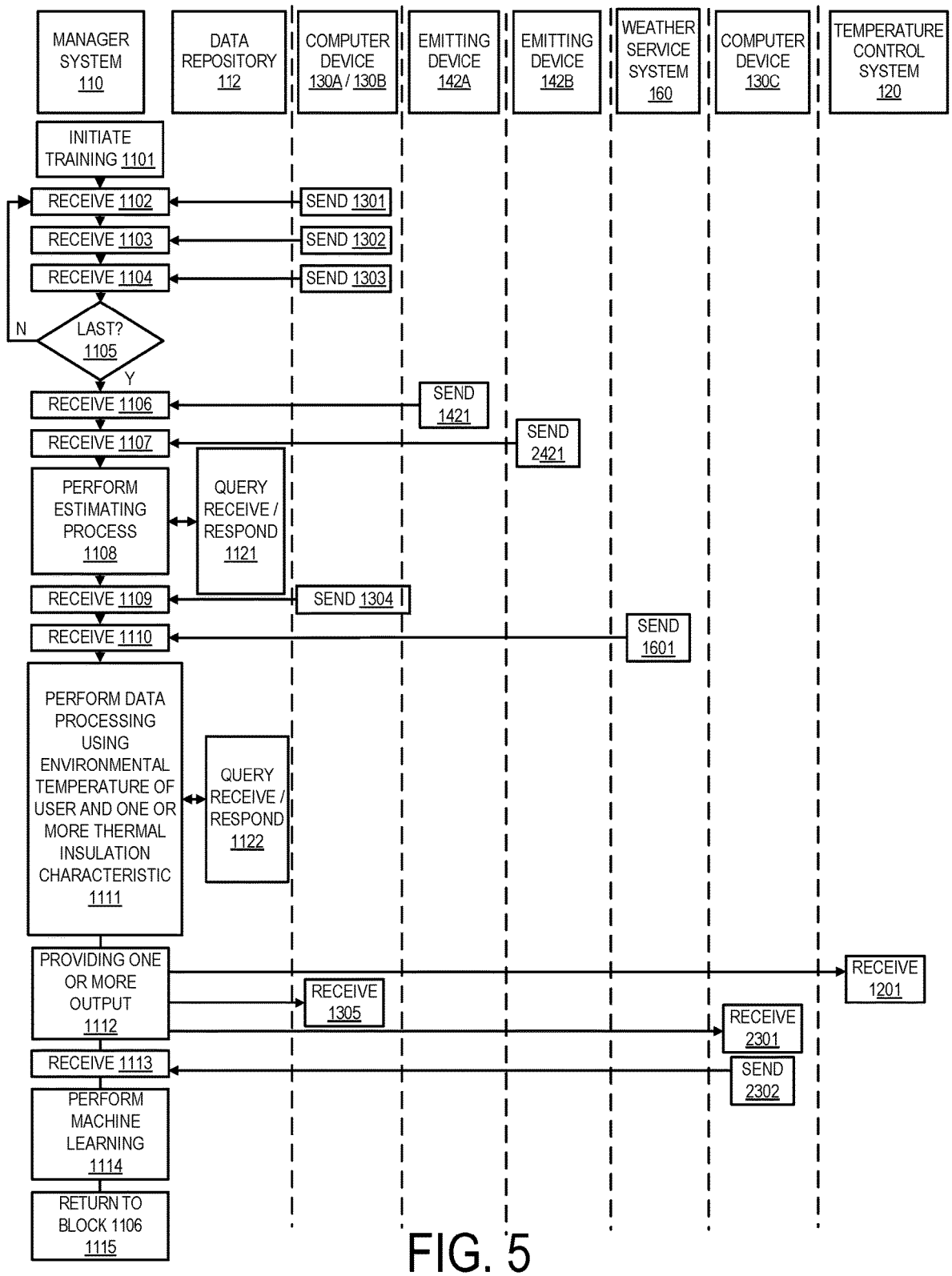
FIG. 5 illustrates a method for performance by a system having a manager system according to one embodiment.

FIG. 5 is a flowchart illustrating a method, providing an example of method 400 described in reference to FIG. 4 as set forth in the context of system 100 (FIG. 1) and particularly in the context of illustrative operations of manager system 110 and its associated data repository 112, computer devices 130A and 130B, emitting devices 142A and 142B, weather service system 160, computer device 130C, and temperature control system 120. At block 1101, manager system 110 can initiate training of manager system 110 so that manager system 110 can provide an estimate of the thermal insulation characteristic of one or more fabric item. In one particular embodiment, operating environment 150 can be in accordance with the operating environment 150 as shown in the example of FIG. 3, including a patient user 144A and a caregiver user 144B. Initiating training at block 1101 can include manager system 110 running training process 113 as set forth in reference to FIG. 1.

Figure 6:
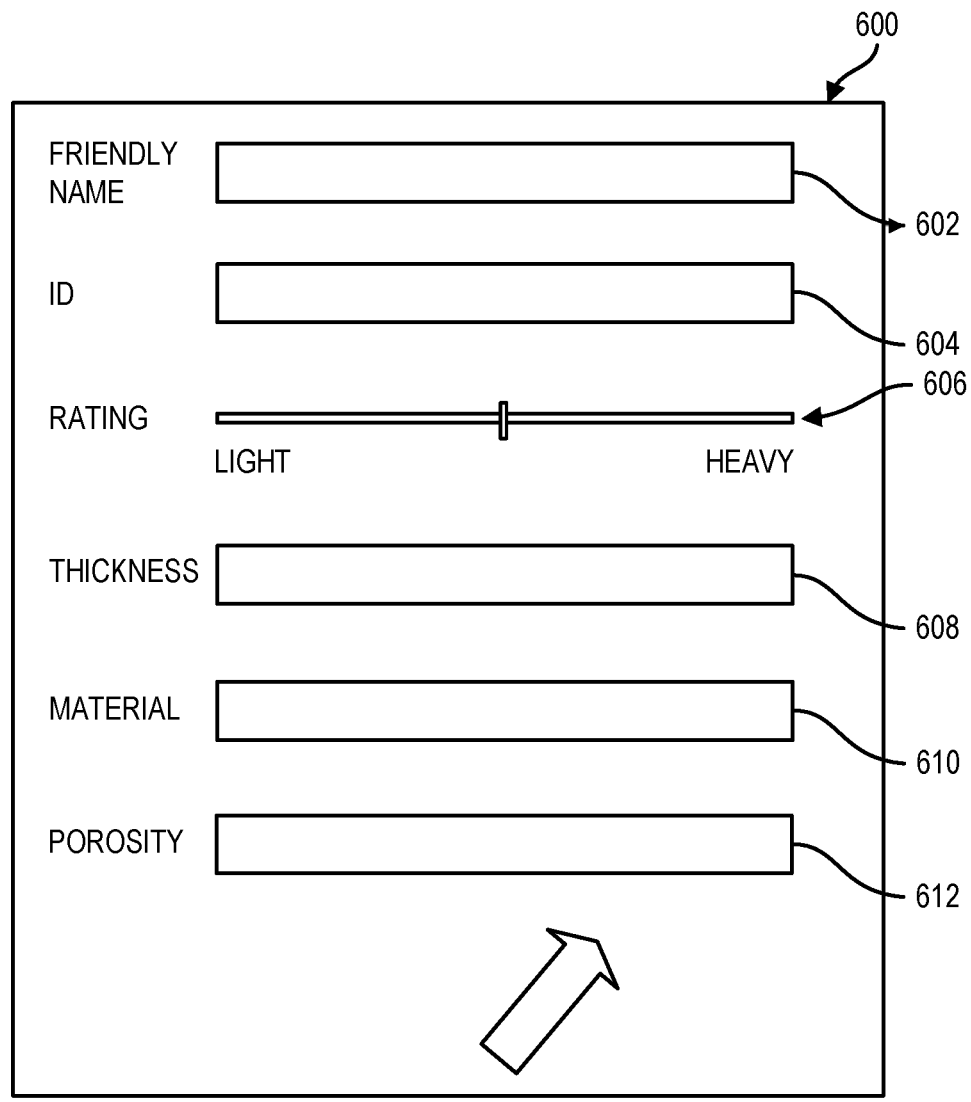
FIG. 6 illustrates a displayed user interface for display on a computer device for use in training a manager system for providing an estimate of a level of thermal insulation of one or more apparel item.

The features of training process 113 in one embodiment are described with reference to FIG. 6, which illustrates a displayed user interface 600 that can be displayed on a user computer device e.g. computer device 130A-130C as set forth in FIG. 3. User interface 600 facilitates training of manager system 110, so that manager system 110 and its associated data repository 112, stores information in respect to one or more fabric item for later detection by system 100 for later use by manager system 110. The user of system 100, such as patient user 144A and/or caregiver user 144B may wish to register one or more fabric items into manager system 110, e.g. in a first training session substantially all regularly used fabric items of a user might be registered.

For registering a fabric item into manager system 110, the user can bring user computer device e.g. computer device 130A-130C (FIG. 3) in close proximity to a fabric item being registered so that the user can closely observe the fabric item and also in some embodiments, to facilitate sensor reading using one or more sensor of the computer device 130A-130C. Referring to user interface 600, a user can enter in area 602 a friendly name for the fabric item being registered e.g. "the red sweater", "the checked shirt", "the fluffy blanket", "the old comforter" etc. The friendly name may be the informal name used by a user to refer to the fabric item. In area 604 the user can enter a serial ID for the fabric item being registered, or manager system 110 can automatically populate area 604 with a new serial number e.g. based on the next available number. In some cases, the supplier of the fabric item can include serial number for the fabric item e.g. in cases where the fabric is made specifically for use with system 100.

Using area 606, provided in the example by a sliding scale, a user can provide a rating for the fabric item. Using area 606, a user can visually observe the fabric item being registered and based on the observations of the user, the user can specify a rating for the fabric item e.g. using area 606 provided by a sliding scale, the user can rate the fabric item on a scale from light to heavy, where a light rating is used to indicate a lighter thermal insulation characteristic based on the observation of the user and a heavy rating is used to indicate a perceived heavier thermal insulation characteristic based on the user's observation that the fabric item will provide heavy thermal insulation. Area can alternatively be provided by a text data field in which natural language scale terminology, e.g. "light," "medium," or "heavy." In area 606, a user can enter information e.g. by manually typing data that specifies a thickness of the fabric item. In area 610, the user can manually enter e.g. by typing, information that specifies the material of the fabric item e.g. cotton, vinyl, wool, and the like. In area 612, a user can enter information that specifies a porosity of the fabric item being registered e.g. can type such rating indicators as "light," "medium," or heavy. Area 612 can be provided by a sliding scale area such as that as shown for area 606. Area 606 can be substituted for by a text field area as indicated by areas 602, 604, 608, 610, and 612. The rating information entered by a user using area 606 can be an estimated rating of clothing insulation in units of clo provided by a user, wherein 1 clo=0.155 m$^2$K/W.

In some embodiments, data of one or more of area 602, 604, 606, 608, 610, and 612 can be automatically populated based on sensor readings provided by a computer device being used by the user that uses user interface 600 e.g. computer device 130A-130C as shown in this specific example of FIG. 3. For example, camera data obtained using a camera sensor device of a computer device being used by a user such as computer device 130A-130C, can be processed to extract encoded information of a barcode represented in camera data captured using the computer device, and the resulting decoded barcode data can be used to populate area 604 indicating a serial number for the fabric item. Manager system 110 in some embodiments in response to a bar code encoding a fabric item serial number being decoded can automatically transmit a message to external system 170 provided by a supplier server to retrieve e.g. rating, thickness, material, and porosity data of the fabric item, to auto-populate areas 602, 606, 604, 608, 610, and 612 and to store the retrieved data into data repository 112. In some embodiments, rating information retrieved from a supplier server can include a rating of clothing insulation e.g. in units of clo. A supplier in one embodiment, can provide a clothing insulating rating according to the ASHRAE-55 2010 Standard.

Processing camera data obtained using a camera sensor device of a computer device 130A-130C, manager system 110 can determine a thickness of the fabric item being registered and/or a porosity of the fabric item being registered. Data automatically determined by such thickness determination processing and porosity determination processing can be automatically populated into the data fields of area 606 and/or area 612 and automatically stored in data repository 112 for later retrieval. For increased accuracy with which a computer device 130A-130C can provide dimensional information a camera sensor device of computer device 130A-130C can be provided e.g. by stereoscopic or LIDAR based camera device. In one embodiment, a computer device 130A-130Z used by a user can include a sensor device provided by a spectroscopy based sensor device that automatically determines a material composition of a fabric item. A user can use the user's computer device having a sensor device provided by a material sensor device to determine a material composition of the fabric item being registered and manager system 110 can automatically populate area 610 with the information of the determined material. Manager system 110 can automatically store the material composition data in materials area 2122.

Referring again to the flowchart of FIG. 5, computer device 130A and/or 130B (as well as 130C) can be sending data at blocks 1301, 1302, and 1303 for receipt by manager system 110 at blocks 1102, 1103, and 1104 respectively. In one embodiment, the data sent at block 1301 can represent textual based data entered by a user using data field areas of user interface 600. Send block 1302 can represent data generated by a user computer device using a first sensor device e.g. a camera sensor device and data send block 1303 can represent data provided by a computer device of the user generated using a second sensor device e.g. a spectroscopic based material composition sensor device.

At block 1105, manager system 110 can determine if the current fabric item being registered is the last fabric item of a set of fabric items being registered by a user. At blocks 1102-1105, a user can be registering any number of fabric items. In some cases, where a computer device obtains a serial ID for a fabric item, manager system 110 can automatically retrieve from a supplier server associated rating thickness material and porosity information associated to the serial identifier. Where a user has not indicated exiting of a training of training process 113, manager system 110 can continue with the loop of blocks 1102-1105 to continue to obtain data for registration into data repository 112 specifying information for various fabric items registered into data repository 112. On receipt of an exit command entered by a user, manager system 110 can proceed to block 1106. One embodiment of manager system 110 running training process 113 is described with reference to blocks 1101-1105 and can include user action of a user using a computer device 130A-130C in an operating environment. In another embodiment, system 100 can be trained based on data provided by a supplier(s) of fabric items 140A-140Z. Where suppliers have stored data on their fabric items in their respective supplier servers, manager system 110 can message such servers to retrieve the fabric item data for registering the fabric items into manager system 110 by storage of data of the fabric items into data repository 112.

At blocks 1106 and 1107, manager system 110 can receive radio signal encoded data from radio signal emitting device 142A and radio signal emitting device 142B. Radio signal emitting device 142A can send radio signal encoded data at block 1421. Radio signal emitting device 142B can send radio signal encoded data at block 2421. At blocks 1106 and 1107, with reference to the specific use case illustrated in FIG. 3, manager system 110 can also or alternatively be receiving radio signal encoded data from radio signal emitting device 142C and radio signal emitting device 142D. For receipt of radio signal encoded data at blocks 1106 and 1107, manager system 110 can include a radio signal reading device disposed in operating environment 150. In the case radio signal emitting devices are provided by a processor based computing node having radio frequency transceiver such reading device can be provided e.g. by a radio transceiver of an access point disposed in operating environment 150 and/or a radio transceiver of one or more user computer device 130A-130C. In one embodiment, where radio signal emitting devices 142A-142D are provided by RFID tags, a radio signal receiving device can be provided by an RFID tag reader. For example, an RFID tag reader can be incorporated as a sensor device of one or more computer device 130A-130C disposed in an environment e.g. the environment as shown in FIG. 3. It will understood that radio signal encoded data receiving depicted by blocks 1106 and 1107 can incorporate data transmission "hops" e.g. including one or more user computer device 130A-130C not depicted in the flowchart of FIG. 5. Various technologies can be employed for the reception of data at blocks 1106 and 1107 so that reception of the wrong data is avoided. Such technologies can include e.g. use of directional radio signal receiving devices and/or shielding technologies to shield fabric items not in use so that that reading of emitted radio signals from radio signal emitting devices disposed on fabric items not in use is avoided.

Radio signal encoded data received at blocks 1106 and 1107 can include e.g. fabric item identifiers encoded on radio signals emitted from radio signal emitting devices 142A-142D. Radio signal encoded data received at blocks 1106 and 1107 can include in addition or alternatively e.g. rating thickness material and/or porosity data regarding the fabric item on which a radio signal emitting device 142A-142D. It will be understood that prior to transition of manager system 110 from block 1105 to block 1106, radio signal emitting devices e.g. as provided by RFID tags or otherwise, can be appropriately configured e.g. encoded. In one embodiment, operating environment 150 can include a radio signal device encoding system for encoding radio signal emitting devices e.g. RFID tags. Radio signal emitting devices 142A-142D can be configured e.g. encoded to emit radio signals having encoded therein e.g. fabric item serial numbers and/or additional data e.g. rating data, thickness data, material data, and/or porosity data. In one embodiment, manager system 110 at blocks 1106 and 1107 can read radio signal encoded data in the form of fabric item serial number and then can use the extracted serial number as a key to receive additional information of the identified fabric item from fabric items area 2121 of data repository 112 e.g. previously registered rating information, thickness information, material information, and/or porosity information.

At block 1108, manager system 110 can perform an estimating process e.g. by triggering estimating process 114 as set forth in reference to FIG. 1. Performing estimating process 114 at block 1108, manager system 110 can determine a thermal insulation characteristic. A thermal insulation characteristic can include e.g. a thermal insulation characteristic of a fabric item. Performance of block 1108 can include multiple queries of data repository 112 as indicated by query receive and respond block 1121 performed by data repository 112. Manager system 110, for performing estimating process 114 at block 1108, can determine a thermal insulation score for one or more fabric item according to the scoring function indicated below in equation one. Eq. 1 is as follows:

$$S = F_1 W_1 + F_2 W_2 + F_3 W_3 + F_4 W_4 \quad \text{(Eq. 1)}$$

Where S is the scoring factor, $F_1$ is a first factor, $F_2$ is a second factor, $F_3$ is a third factor, and $F_4$ is a fourth factor, and where $W_1$-$W_4$ are weights respectively associated to the respective factors $F_1$-$F_4$. Eq. 1 can be used to determine a thermal insulation score for each fabric item having an identifier received at blocks 1106 and 1107. Factor $F_1$ can be a rating factor e.g. can include the rating entered by a user using area 606 of user interface 600 of FIG. 6 or retrieved from a supplier server. Factor $F_2$ can be a thickness factor, factor $F_3$ can be a material factor, and factor $F_4$ can be a porosity factor. The thickness, material, and porosity factors can include registered data based on data e.g. entered by a user as text data using data field area 608, 606, 610, and 612 and/or using sensor determined data automatically sensed by a sensor of a computer device used by a user to autopopulate the areas 608, 610, and 612 and/or data retrieved by a supplier server. Manager system 110 can use Eq. 1 to determine a scoring factor for each fabric item sensed. The scoring factor, S, for a certain fabric item in one embodiment can represent a thermal insulation characteristic of a sensed fabric item and in one embodiment can represent the fabric item's ability to provide thermal insulation to a user. The scoring factor, S, for a certain fabric item in one embodiment can represent a thermal insulation characteristic of a sensed fabric item provided by a clothing insulation rating in units of clo. In one embodiment system 100 can use thermal insulation ratings in clo units for fabric items provided by apparel items as well as fabric items provided by bedding items. Manager system 110 can be configured in one embodiment so that the values of the weights $W_1$-$W_4$ are dynamically varied based on characteristics of current data. For example wherein the ratings factor $F_1$ includes supplier provided clothing insulation rating data in units of clo, the weights $W_1$-$W_4$ can be biased in favor of $W_1$. In one embodiment, where $F_1$ provides clothing insulation rating data in units of clo, and the scoring factor S is also in units of clo, S can be regarded as a sharpened estimate of clothing insulation in units of clos sharpened based on factors $F_2$-$F_4$.

Manager system 110 at block 1108 can combine scoring factors for different fabric items to determine a cumulative scoring factor for combinations of fabric items e.g. a combined score to provide a thermal insulation characteristic for a combination of layers of clothing including plural layers of fabric items and/or a combination of layers of bedding provided by a combination of fabric items provided e.g. by sheets and/or blankets defining a bedding arrangement for a bed. At block 1108, manager system 110 for providing a thermal insulation score for any multi-layer apparel arrangement or bedding arrangement can employ Eq. 2 as set forth below. Eq. 2 is as follows:

$$S_{COMBINED} = S_1 + \ldots S_N \quad \text{(Eq. 2)}$$

Where $S_{COMBINED}$ is the cumulative thermal insulation score for the multi-layer arrangement and N is the number of layers. At block 1108, manager system 110 can determine an ordering of layers e.g. can determine which of the layers of an arrangement of layers is an outer layer and which layer of an arrangement of layers is an inner layer. For example, to perform such determining manager system 110 can examine a signal strength of a received radio signal carrying radio signal encoded data and lower signal strength signals can indicate lower layers whereas higher signal strength signals can indicate outer layers. On completion at block 1108, manager system 110 can proceed to blocks 1109 and 1110 to receive environmental temperature data. The scoring factor, $S_{COMBINED}$ for a certain fabric item layer arrangement in one embodiment can represent a thermal insulation characteristic of a sensed fabric item layer arrangement and in one embodiment can represent the layer arrangement's ability to provide thermal insulation to a user. The scoring factor, $S_{COMBINED}$, for a certain fabric item layer arrangement in one embodiment can represent a thermal insulation characteristic of a sensed fabric item layer arrangement provided by a clothing insulation rating in units of clo. In one embodiment system 100 can use thermal insulation ratings expressed in clo units for layer arrangements of fabric items provided by apparel items as well as fabric items provided by bedding items. In one embodiment, where the scoring factor $S_{COMBINED}$ is also in units of clo, $S_{COMBINED}$ can be regarded as a sharpened estimate of clothing insulation in units of clo. In one embodiment, the scoring factor $S_{COMBINED}$ for a layer arrangement of fabric items can be based on a function other than a summing of scoring factors for individual layers, e.g. can incorporate rules for determining clothing insulation ratings for layered clothing set forth in the ASHRAE-55 2010 Standard. At block 1108 manager system can determine one or more thermal characteristic, e.g., an S factor value (Eq. 1) for one or more fabric item, and/or an $S_{COMBINED}$ factor value of one or more layer arrangement e.g. of fabric items provided by apparel fabric items and/or bedding fabric items.

Computer device 130A and 130B can send environment temperature data at block 1304 and weather service system 160 can send environment temperature data at block 1601 for receipt by manager system 110 at block 1110. At block 1111, manager system 110 can perform data processing using an environmental temperature of a user and one or more thermal characteristic as determined e.g. at block 1108. Performing block 1111, manager system 110 can run evaluation process 115 (FIG. 1) to evaluate a current layering arrangement e.g. regarding apparel of a user and/or bedding of a user in reference to an obtained environmental temperature e.g. as received at block 1109 and/or 1110 from weather service system 160. Performance of block 1111 can include multiple queries of data repository 112 as is indicated by query receive and respond block 1122 performed by data repository 112. For performance of evaluating at block 1111 manager system 110 can use one or more thermal characteristic determined at block 1108, e.g. an S factor value (Eq. 1) for one or more fabric item, and/or an $S_{COMBINED}$ factor value (Eq. 2) for one or more layer arrangement e.g. of fabric items provided by apparel fabric items and/or bedding fabric items.

Evaluating which can be performed at block 1111 can include evaluating to determine whether a current layering arrangement is appropriate. For example, in some instances manager system 110 at block 1111 can determine that a current layering arrangement is insufficient. In another example, manager system 110 at block 1111 can determine that a current layering arrangement e.g. of apparel and/or bedding is too extensive. User environmental temperature data received at blocks 1109 and 1110 can include environment temperature data of a current location of a user and/or temperature data of an expected future location of a user. For example, referring to block 1304, in which computer device 130A-130B sends temperature data for receipt by manager system 110 at block 1109, such data can be sent with computer device 130A and 130B inside a building e.g. internal to dashed border 153 indicated in FIG. 1. Location services that can be run by system 100 can discern e.g. that a patient user 144A as well as computer devices 130A and 130B are internal to a building indicated by dashed border 153, in which case data sent at block 1304 can be confirmed to be a useful indicator of inside building temperature of a patient user wherein a patient user is currently located. However, system 100 is able to provide evaluation at block 1111 at to a current layering arrangement in reference to an expected future location of a user such as patient user 144A, depicted in FIG. 3. In such a use case where a patient is determined to be inside a building, temperature data provided by weather service system 160, at block 1601 can provide data as to an expected future location of patient user 144A e.g. in anticipation of patient user 144A transitioning to an outside environment 154 (FIG. 1) external to a building indicated by dashed border 153.

Evaluating which can be performed at block 1111 can include evaluating according to thermal comfort standards. For example rules that can be applied for performing evaluating can be based on the ANSI/ASHRAE Standard 55. In one embodiment, thermal comfort can be evaluated using the Predicted Mean Vote (PMV) model. According to principles of thermal comfort, thermal neutrality can be maintained when heat generated by human metabolism is allowed to dissipate, thus maintaining thermal equilibrium with the surroundings. Factors that can influence thermal comfort can include e.g. clothing insulation, air temperature, mean radiant temperature, air speed, humidity, and metabolic rate of the user fort whom thermal comfort is being determined. At blocks 1109 and 1110 manager system 110 in one embodiment can receive environment mean radiant temperature, air speed, and humidity data for operating environment 150 in addition to temperature data. These factors can alternatively be estimated based on data specifying expected normal conditions. Clothing insulation ratings can be provided e.g. by the factors $F_1$, $S$, and $S_{COMBINED}$ set forth herein. In one embodiment, evaluating which can be performed at block 1111 can reference modeling data that represents the metabolic rate of the user for whom thermal comfort is being determined. Metabolic rate modeling data can be stored in users area 2123 and can be iteratively updated using machine learning processed set forth herein e.g. as set forth in reference to block 1114.

On completion of block 1111, manager system 110 can proceed to block 1112 to perform providing one or more output. Outputting at block 1112 by manager system 110 at block 1112 can include providing various types of outputs e.g. output can include a control output for receipt by temperature control system 120 at block 1201. For example, if processing at block 1111 indicates that a current layering arrangement of a user e.g. apparel and/or bedding is too extensive and may cause overheating of the user, manager system 110 at block 1112 can output a control to temperature control system 120 for receipt at block 1201 by temperature control system 120 to lower the building temperature.

If on the other hand, processing at block 1111 by manager system 110 indicates that a current layering arrangement e.g. including apparel and/or bedding is insufficient based on a current building temperature manager system 110 at block 1112 can output a temperature control communication for receipt by temperature control system 120 at block 1201 to increase the building temperature. Outputting data by manager system 110 at block 1112 can include outputs to provide indicators on one or more computer device of operating environment 150. An output by manager system 110 for providing an indication can be received by computer device 130A and 130B at block 1305 and received by computer device 130C provided by a smart watch at block 2301.

Figure 7:
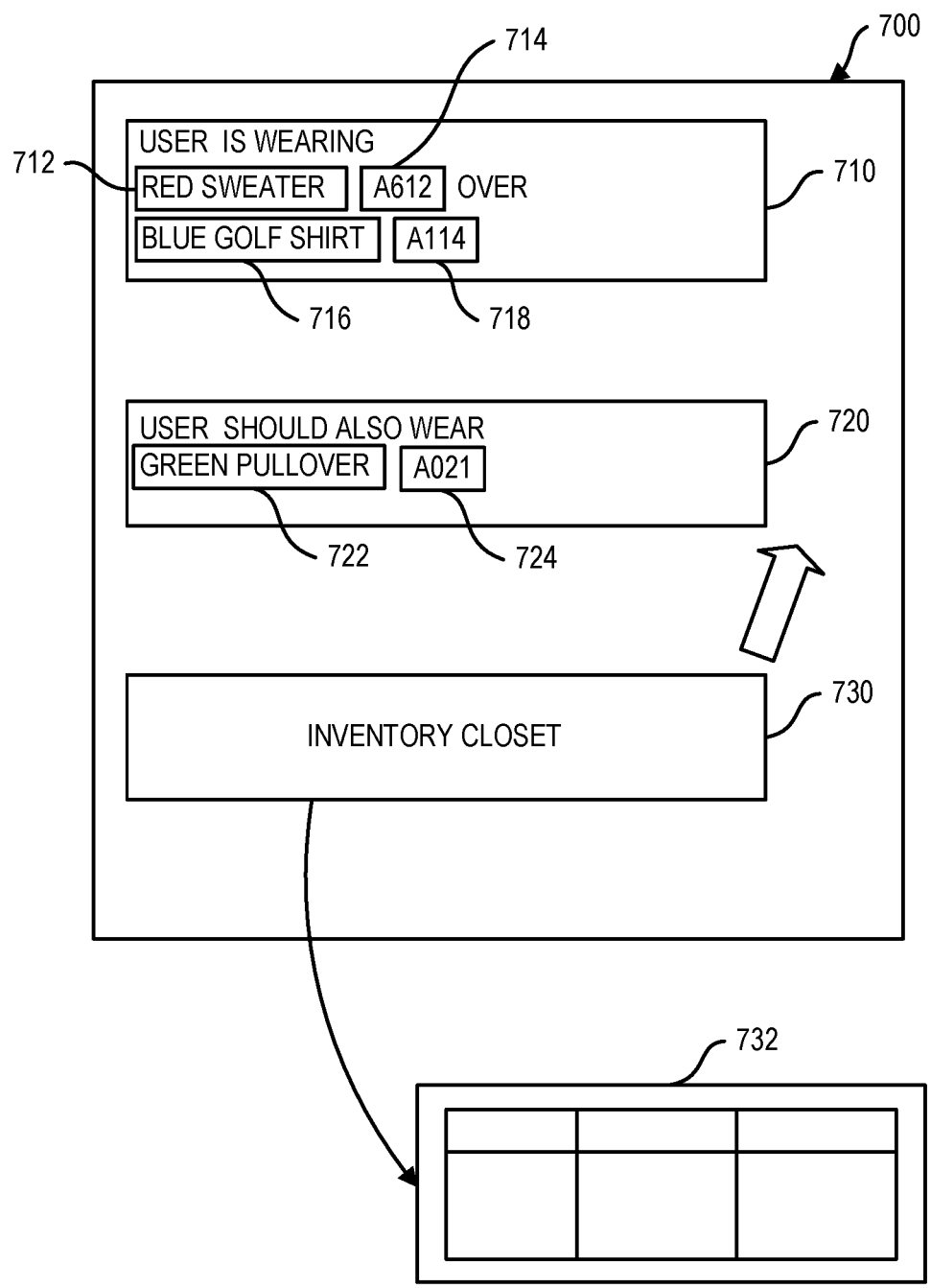
FIG. 7 depicts a displayed user interface for prompting adding or removing apparel items from a user.

Indicators that are indicated by user computer devices within an operating environment 150 e.g. as shown in FIG. 3 are described further in FIG. 7 illustrating user interface 700 that can be displayed on a display of a user computer device e.g. a user computer device 130A-130C as shown in the example environment of FIG. 3. In area 710, user interface 700 can display data indicating a current layering arrangement as detected by manager system 110. The layering arrangement specified can include an apparel layering arrangement as illustrated in the specific example of FIG. 7 and/or a bedding layer arrangement. In area 710, user interface 700 provided by manager system 110 can indicate an ordering of layers e.g. which layer is an inner layer and which layer is an outer layer. In this specific example, the first layer is stated to be over a second layer indicating that the first layer is an outer layer and the second layer is an inner layer. In area 712, user interface 700 can specify a friendly name for a detected fabric item detected within an operating environment 150. In area 714, user interface 700 can specify a serial number associated with the fabric item having a friendly name specified in area 712. In area 716, user interface 700 can display a friendly name associated with another fabric item detected to be in operating environment 150. In area 718, user interface 700 can display a serial number associated with the fabric item having the friendly name depicted in area 716.

In area 720, user interface 700 provided by manager system 110 at block 1112 can present a prompt that prompts a user to take action in view of an evaluation performed by manager system 110 at block 1111. For example, wherein an evaluation performed at block 1111 determines that a current layering arrangement is insufficient for an inside building temperature manager system 110 at block 1111 can provide, in area 720, the prompt indicating that "user should also wear green pullover." For performance at block 1111 manager system 110 in one embodiment may not merely determine that extra layering in general would be helpful, but in some embodiments can determine, based on stored data thereof, that a precise one or more certain fabric item registered in fabric items area 2121 out of a plurality of candidate fabric items registered in fabric item area 2121 will provide a specific additional amount of additional insulation under current conditions. Accordingly, in area 722, user interface 700 can indicate a specific fabric item registered in data repository 112 e.g. in this specific example the fabric item depicted and identified by the friendly name "green pullover" specified in area 722 and having the associated unique serial number that is specified in area 724.

User interface 700 can include multiple additional features e.g. by activating inventory closet area 730, which can be provided by a button, a user can view area 732 which allows a user to browse an entire inventory of fabric items including apparel items and/or bedding items for a particular user or alternatively all users. Insulating characteristic data can be displayed in area 732 associated with each fabric item displayed to allow a user to make an informed choice in regard to an additional layer if an additional layer is recommended. In area 720, user interface 700 can prompt for alternative action e.g. removing one or more current layer of apparel and/or bedding. User interface 700 can display prompt information in area 720 pertaining to a current condition e.g. a prompt based on a user currently being inside a building. In addition or alternatively area 720 can prompt a user to take action in reference to a future activity e.g. in area 720 user interface 700 can display a prompt for prompting a user in regard to recommended layering associated with the transition to outside environment 154. Such a prompt that can be output in area 720 can be based on an estimate of one or more thermal insulation characteristic determined by manager system 110 at block 1108 and temperature data sent by weather service system 160 at block 1601 and received by manager system 110 at receive block 1110.

At block 1113, manager system 110 can receive temperature data from computer device 130A provided by a wearable computer device such as a smart watch having a sensor device provided by a temperature sensor device sent by computer device 130C at block 2302. Temperature data sent at block 2302 and received at block 1113 can be temperature data that indicates a current body temperature of a user. Based on the received body temperature received at block 1113, manager system 110 can perform machine learning process at block 1114.

Performing machine learning process at block 1114 can include running machine learning process 116 (FIG. 1). In one embodiment, manager system 110 at block 1114 can store body temperature data received at block 1113 to facilitate e.g. later trend analysis or thermal model data that builds a thermal model of a user over time. In one embodiment, manager system 110 at block 1114 can store body temperature data received at block 1113 for a certain user into users area 2123 of data repository 112 and can update modeling data that models a metabolic rate of the certain user. Thus, manager system 110 can reference updated metabolic rate modeling data during each iteration of block 1111 for performance of evaluating thermal comfort of the certain user. In one embodiment, evaluating which can be performed at block 1111 can reference modeling data that represents the metabolic rate of the user for whom thermal comfort is being determined. Metabolic rate modeling data can be stored in users area 2123 and can be iteratively updated using machine learning processes set forth herein e.g. as set forth in reference to block 1114.

In one embodiment, manager system 110 at block 1114 can store body temperature data together with data specifying a current layering arrangement e.g. apparel layering arrangement in a "good results" section of results area 2124 based on a determination at block 1114 that a current body temperature is within a target acceptable range and in the case that manager system 110 at block 1114 determines that a current body temperature of a user is out of acceptable range can store data specifying a current layering arrangement e.g. apparel layering arrangement in a "bad results" section of results area 2124. The "good results" section and "bad results" section can be logical sections of results area 2124.

Layering arrangement data can be stored in the "good results" section of results area 2124 on the condition that a current body temperature is within a target range, e.g. an equilibrium range. Manager system 110 in the performance of block 1108 and/or block 1110 can examine data of the "good results" section and the "bad results" section to bias estimates (block 1108) and/or evaluations (block 1111) performed by manager system 110. A "bad results" section of results area 2124 can include a "too hot" subsection that specifies arrangements wherein a user's body temperature was higher than a target range by a threshold and a "too cold" subsection that specifies arrangements wherein a user's body temperature was lower than a target range by a threshold. For example, in the performance of block 1108 on the determination that a fabric item is referenced in a "too hot" subsection, manager system 110 can bias a ratings factor, factor $F_1$, so that a thermal insulation characteristic indicated by $F_1$ indicates increased thermal insulation. At block 1108 on the determination that a fabric item is referenced in a "too cold" subsection, manager system 110 can bias a ratings factor, factor $F_1$, so that a thermal insulation characteristic indicated by $F_1$ indicates reduced thermal insulation. As noted factors such as $F_1$, S, and $S_{COMBINED}$ can represent a determined clothing insulation rating in units of clo in one embodiment.

In one example of the performance of block 1111, manager system 110 can provisionally perform an evaluation that would ordinarily result in a prompt being output at block 1112 that prompts a user to adjust e.g. increase layering. However, in one embodiment according to such example manager system 110 at block 1111 can be configured to further evaluate a provisional determination based on an examination of "good results" section of results area 2124. On the determination that a current layering arrangement was recorded in the "good results" section of results area 2124, under temperature conditions similar to the current temperature conditions, manager system 110 can adjust an $S_{COMBINED}$ rating used for the evaluation at block 1111 so that the described prompt condition can be avoided. Manager system 110 can use "results" data in a variety of ways. For example if data of a "good results" section of results area 2124 indicates that a current layer arrangement subject to data processing during an iteration at block 1111 having a certain set of layers yielded good results in the past for a first ordering of the certain set of layers and a "bad results" section of results area 2124 indicates that a current layer arrangement having a certain set of layers yielded bad results in the past for a second ordering of the certain set of layers, manager system 110 at block 1112 can output a prompt to assure that the user uses the first ordering and avoids the second ordering. Thus, machine learning process 116 permits system 100 to learn over time based on past results data and to improve its performance over time based on such past results data.

On completion of block 1114 manager system 110 can proceed to block 1115 at which manager system 110 can return to block 1106. Manager system 110 can thus perform multiple iterations of blocks 1106-1114. During the multiple iterations manager system 110 can e.g. adjust determinations and outputs based e.g. on changing temperature conditions, fabric items in use, and changes in estimating and/or evaluating processed resulting from machine learning processes.

Certain embodiments herein may offer various technical computer advantages involving computer advantages to address problems arising in the realm of computer networks such as, maintaining comfort of computer users using computer devices e.g. either manually and/or passively by wearing wearable computer devices having sensing devices. Various automated processes can be employed to register one or more fabric item affecting user comfort including e.g. fabric items provided by apparel items and/or fabric items provided by bedding items. Radio signal processing technologies can be employed to receive radio signal encoded data that encodes information on such fabric items, embodiments herein can include a training process that allows registration of fabric items into a data repository for later access. Embodiments herein can include an estimating process that estimates one or more thermal insulation characteristic using received radio signal encoded data. Embodiments herein can include an evaluation process that evaluates a thermal comfort of a user. Embodiments herein can provide one or more output based on a result of an evaluation process. The one or more output can be automatically provided e.g. to present a notification to one or more users and/or for machine control. Embodiments herein can include machine learning processes, so that performance of estimating and/or evaluating processes is improved based on an examination of record result data.

Figure 8:
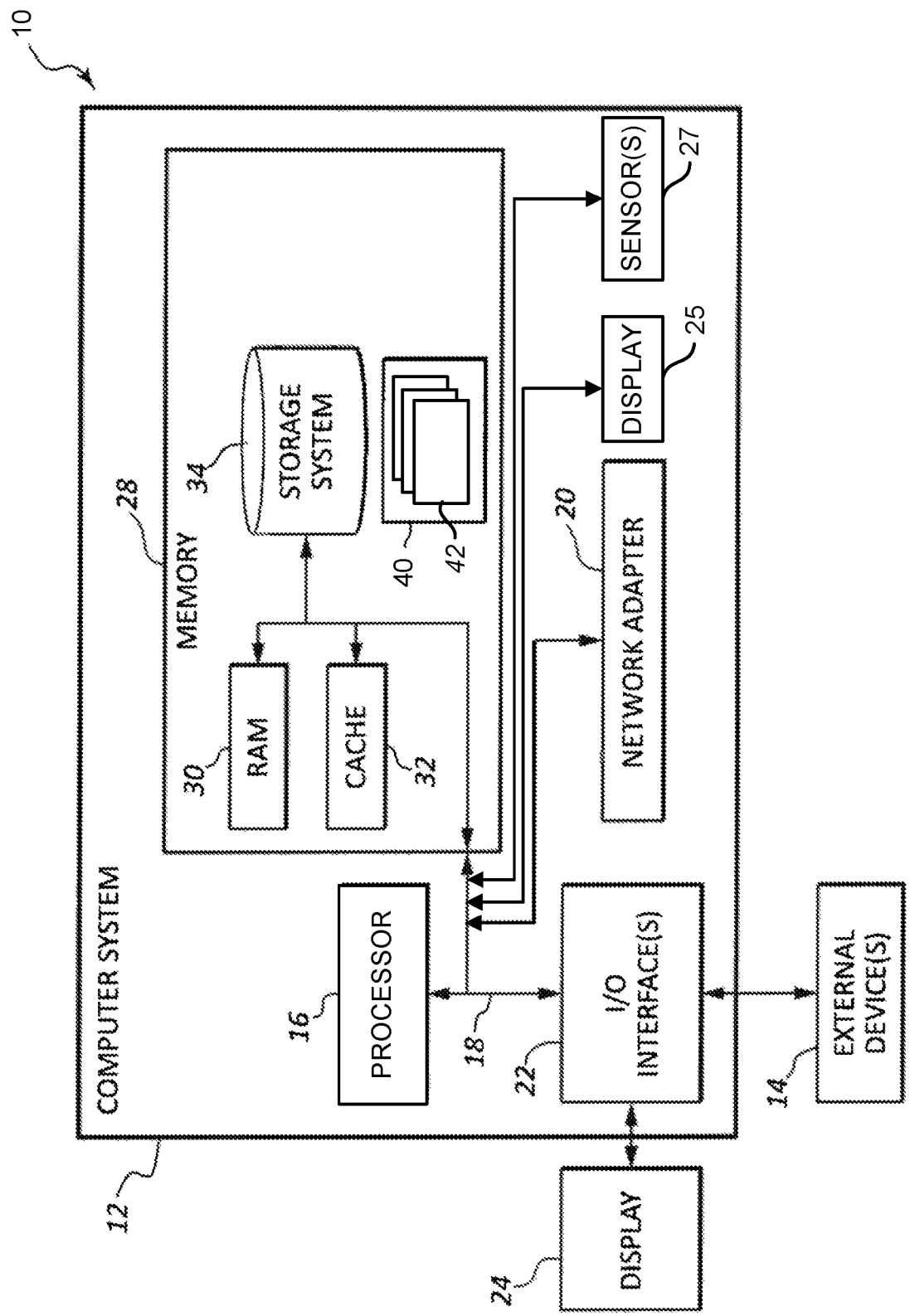
FIG. 8 depicts a computing node according to one embodiment.
Figure 9:
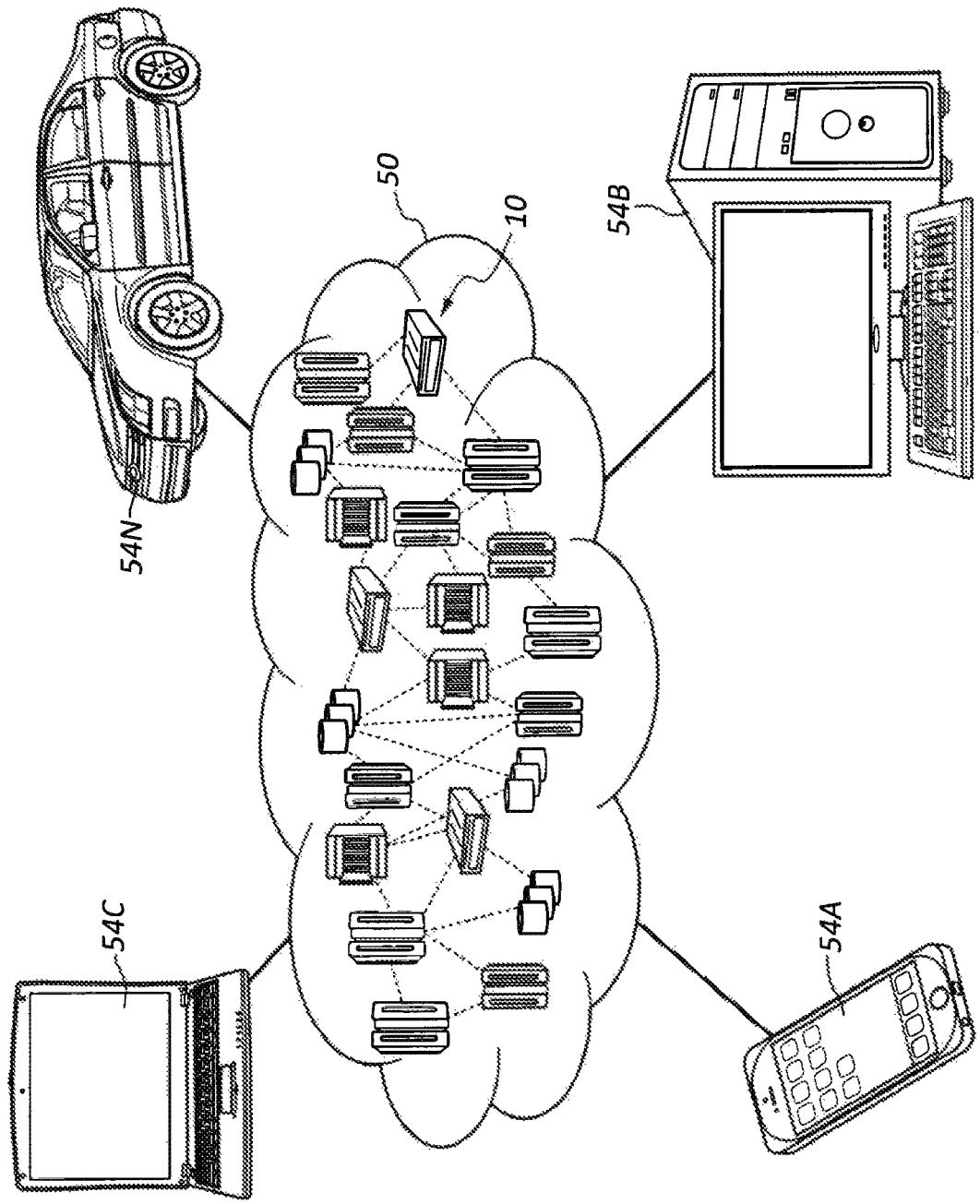
FIG. 9 depicts a cloud computing environment according to one embodiment.
Figure 10:
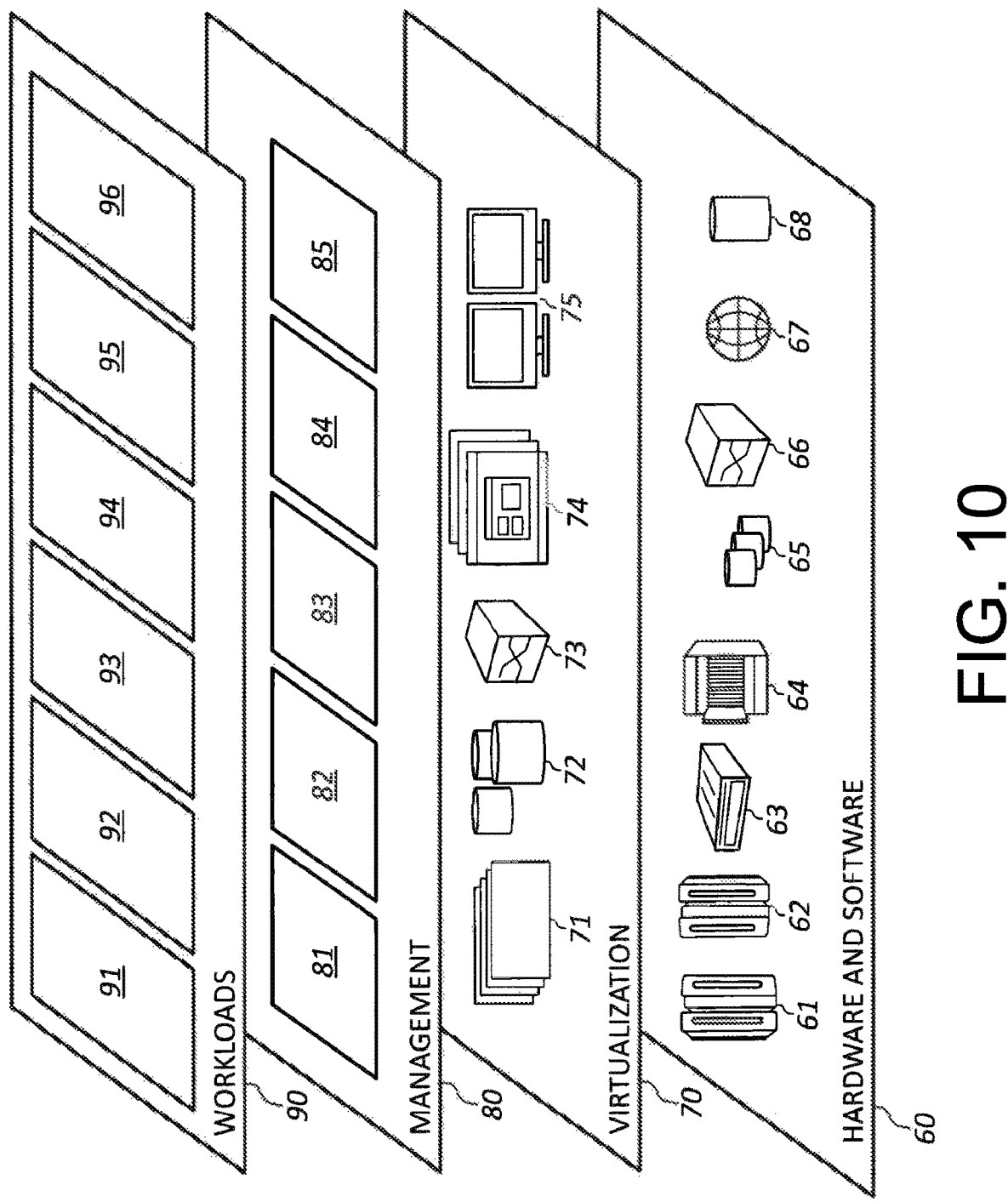
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, can include one or more program 40 for performing functions described with reference to method 400 of FIG. 4, and the functions described with reference to manager system 110 as set forth in the flowchart of FIG. 5. In one embodiment, one or more user computer device 130A-130Z can include one or more computing node 10 and can include one or more program 40 for performing functions described with reference to one or more user computer device 130A-130Z as set forth in the flowchart of FIG. 5.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera device, a gyroscope device, a temperature sensor device, a humidity sensor device, a pulse sensor device, a blood pressure (bp) sensor device, a material analyzer device (e.g. spectroscopy based), and RFID reading device, or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for fabric item sensing and temperature condition sensing and responsively providing one or more output as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining radio signal encoded data from one or more radio signal emitting device disposed on one or more fabric item used for thermal insulation by a user;
   performing data processing using an obtained environmental temperature of the user and one or more thermal characteristic, wherein the one or more thermal characteristic is determined using the radio signal encoded data; and
   providing one or more output based on the data processing, wherein the one or more thermal characteristic is a thermal insulation characteristic of the one or more fabric item currently being used for thermal insulation by the user, and wherein the data processing includes evaluating a thermal comfort of the user using the obtained environmental temperature of the user and the one or more thermal characteristic.

2. The method of claim 1, wherein the data processing includes registering a certain fabric item of the one or more fabric item, wherein the registering includes storing data of the certain fabric item into a data repository, wherein the data including data obtained using a sensor device that senses a characteristic of the fabric item.

3. The method of claim 1, wherein determining the one or more thermal characteristic includes using the scoring factor $S=F_1 W_1 + F_2 W_2 + F_3 W_3 + F_4 W_4$, wherein $F_1$ is a rating factor, $F_2$ is a thickness factor, $F_3$ in a material factor and $F_4$ is a porosity factor, and wherein $W_1$-$W_4$ are weights associated to the respective factors.

4. The method of claim 1, wherein determining the one or more thermal characteristic includes determining a clothing insulation rating of a layer arrangement of apparel items.

5. The method of claim 1, wherein the method includes iteratively performing the data processing, and wherein the method includes iteratively updating metabolic rate modeling data of the user using results data, the results data including body temperature data of the user, wherein the iteratively performing the data processing includes using the metabolic rate modeling data.

6. The method of claim 1, wherein determining the one or more thermal characteristic includes extracting identifiers for a plurality of apparel items, and looking up data stored in a data repository associated to the identifiers.

7. The method of claim 1, wherein the one or more output includes an output to prompt the user to add or remove at least one layer of a layer arrangement defined by the one or more fabric item.

8. The method of claim 1, wherein the one or more output includes an output to control a temperature control system for controlling a temperature in an environment of the user.

9. The method of claim 1, wherein the environmental temperature of the user is an outside temperature of an outside environment in which the user is expected to transition to.

10. The method of claim 1, wherein the method includes performing a machine learning process and wherein according to the machine learning process, results data is recorded into a data repository and wherein one or more of determining the one or more thermal characteristic or the data processing is based on the results data.

11. The method of claim 1, wherein the obtained environmental temperature is a building temperature of a building in which the user is located, wherein the one or more fabric item includes a first fabric item and a second fabric item, wherein the radio signal encoded data includes a first identifier of the first fabric item and a second identifier of second fabric item, wherein the first fabric item and the second fabric item define a layer arrangement that provides thermal insulation to the user, wherein the one or more thermal characteristic includes a thermal insulation characteristic of the layer arrangement, wherein the method includes determining the thermal insulation characteristic using the first identifier to look up fabric material data of the first fabric item from a data repository and using the second identifier to look up fabric material data of the second fabric item from the data repository, wherein the one or more output includes a control output to adjust the building temperature of the building in which the user is located.

12. The method of claim 1, wherein the one or more fabric item includes a first fabric item and a second fabric items, wherein the radio signal encoded data includes a first identifier of the first fabric item and a second identifier of second fabric item, wherein the one or more thermal characteristic includes a thermal insulation characteristic of the one or more fabric item, wherein the one or more output includes an output that prompts the user to include an additional layer in an arrangement of layers providing thermal insulation to the user, the arrangement of layers including the first fabric item.

13. The method of claim 1, wherein the user is a patient user, wherein the one or more fabric item includes a first bedding layer and a second bedding layer, wherein the radio signal encoded data includes a first identifier of the first fabric item and a second identifier of second fabric item, wherein the first bedding layer and the second bedding layer define a bedding layer arrangement that provides thermal insulation to the user, wherein the one or more thermal characteristic includes a thermal insulation characteristic of the bedding layer arrangement, wherein the method includes determining the thermal insulation characteristic using the first identifier to look up fabric material data of the first fabric item from a data repository and using the second identifier to look up fabric material data of the second fabric item from the data repository, wherein the one or more output includes an output that prompts the patient user to include an additional layer in an arrangement of layers providing thermal insulation to the patient user, the arrangement of layers including the first fabric item.

14. A computer program product comprising:
   a computer readable storage medium readable by one or more processing circuit and storing instructions hr execution by one or more processor for performing a method comprising:
      obtaining radio signal encoded data from one or more radio signal emitting device disposed on one or more fabric item used for thermal insulation by a user;
      performing data processing using an obtained environmental temperature of the user and one or more thermal characteristic, wherein the one or more thermal characteristic is determined using the radio signal encoded data; and
      providing one or more output based on the data processing, wherein determining the one or more thermal characteristic includes determining a clothing insulation rating of a layer arrangement of apparel items.

15. The computer program product of claim 14, wherein the data processing includes evaluating a thermal comfort of the user using the obtained environmental temperature of the user and the one or more thermal characteristic.

16. The computer program product of claim 14, wherein the one or more thermal characteristic is a thermal insulation characteristic of the one or more fabric item currently being used for thermal insulation by the user, and wherein the one or more output includes a prompt to the user prompting the user to adjust a current layer arrangement for providing thermal insulation to the user, wherein the current layer arrangement includes a fabric item of the one or more fabric item.

17. The computer program product of claim 1, wherein the one or more output includes an output to control a temperature control system for controlling a temperature in an environment of the user.

18. The computer program product of claim 14, wherein the data processing includes evaluating a thermal comfort of the user using the obtained environmental temperature of the user.

19. A system comprising:
   a memory;
   at least one processor in communication with the memory; and
   program instructions executable by one or more processor via the memory to perform a method comprising:
      obtaining, by at least one computing node, radio signal encoded data from one or more radio signal emitting device disposed on one or more fabric item used for thermal insulation by a user, the at least one computing node being external from the one or more radio signal emitting device;
      performing, by the at least one computing node, data processing using an obtained environmental temperature of the user and one or more thermal characteristic, wherein the one or more thermal characteristic is determined using the radio signal encoded data; and
      providing, by the at least one computing node, one or more output based on the data processing, wherein the one or more thermal characteristic is a thermal insulation characteristic of the one or more fabric item used for thermal insulation by the user, and wherein the one or more output includes a prompt to the user prompting the user to adjust a layer arrangement for providing thermal insulation to the user, wherein the layer arrangement includes a fabric item of the one or more fabric item.

20. The system of claim 19, wherein the obtaining, by the at least one computing node, radio signal encoded data from one or more radio signal emitting device disposed on one or more fabric item used for thermal insulation by a user includes obtaining, by the least one computing node, radio signal encoded data from one or more radio signal emitting device disposed on one or more fabric item currently being used for thermal insulation by a user, wherein the one or more thermal characteristic is a thermal insulation characteristic of the one or more fabric item currently being used for thermal insulation by the user, and wherein the one or more output includes an output to control a temperature control system for controlling a current temperature in an environment of the user.

* * * * *